Patented Oct. 7, 1941

2,258,099

UNITED STATES PATENT OFFICE 2,258,099

PROCESS OF PREPARING GELS

Walter A. Patrick, Jr., Baltimore, Md., assignor to Davison Chemical Corporation, Baltimore, Md., a corporation of Maryland No Drawing. Application October 28, 1938, Serial No. 237,585

9 Claims. (Cl. 23—143)

This invention relates to the preparation of gel structures having a high adsorbency coefficient. Also, the invention comprehends a metal oxide gel capable of exerting a powerful catalytic function.

So far as I am aware, there has not been heretofore produced by commercially satisfactory processes a catalytic gel having capillaries of a fineness comparable to those of silica gel.

It is the object of the invention to form gel structures generally by a commercially feasible method, and particularly gels which are capable of exerting a catalytic effect.

Gels produced in accordance with the present invention have, as stated, exceedingly fine capillaries, i. e., less than a wave length of visible light and are hard, amorphous, glassy, and transparent. Furthermore, the gel product has the important characteristic of being heat stable. Such gels are useful in the chemical industries and particularly in the treatment of oils, such as mineral oils where the adsorbent properties combined with the catalytic function, render the product of very substantial utility.

I have discovered that two critical conditions are necessary for the formation of a gel structure of the high quality produced in accordance with this invention. First, the colloidal solution must be substantially devoid of coagulating influences, e. g., electrolytes, and second, at the time of dehydration, the hydrosols should be in an optimum state of dispersion. Stated another way, the presence of electrolytes or other coagulant must be so controlled as to be well below the threshhold value of a concentration necessary to produce coagulation of the metal oxide, and the quality of the gel is dependent upon the completeness of the colloidal dispersion prior to dehydration and the absence of any appreciable concentration of electrolytes effective to coagulate the sols as the colloidal solution is converted to the gel phase by dehydration.

The invention will be illustrated as applied to the formation of gels of aluminum oxide, it being understood that it is equally concerned with gels generally, and particularly gels having a catalytic function.

Inasmuch as sols of aluminum oxide are coagulated by electrolytes in solution, and furthermore since increasing concentration of electrolytes profoundly modifies the quality of the material obtained from the dehydration of the sol, I have discovered that it is possible to operate under conditions in which the solution is maintained substantially free of coagulating electrolytes before and during dehydration. To explain, I have determined that the quality of the solid obtained from the dehydration of a precipitate will vary with the dispersion of the same before dehydration. If the precipitate is so dispersed as to form a colloidal solution or sol, then a gel having maximum adsorptive properties will result after careful dehydration provided no coagulation occurs due to increasing concentration of dissolved electrolytes.

While iron or aluminum hydroxides may be precipitated from solution, washed, and then dried to produce amorphous solids which possess in some degree similar properties to the adsorbent gels, it is impractical to sufficiently wash large quantities of either aluminum or ferric hydroxides, owing to the voluminous nature of these materials. Therefore, the preparation of satisfactory gels by the method of washing and peptization is not of practical value.

From the above, it can be readily understood that a satisfactory adsorbent gel cannot be obtained by the dehydration of a precipitate, nor can one be prepared from a sol if the latter contain too high a concentration of electrolytes during dehydration. The process to be hereafter described is not so restricted, but is readily applicable to large scale commercial operation.

In accordance with my invention, aluminum, (Al) is treated with an aqueous solution of a weak, volatile acid capable of forming a soluble salt with the aluminum and which salt readily undergoes hydrolysis in the aqueous medium. While various acids may be employed having the above properties, I prefer in connection with aluminum, an organic acid, such as acetic acid. As will be appreciated, the acetic acid combines with the aluminum to form an unstable metallic salt, aluminum acetate, which latter, under the critical conditions maintained, readily hydrolyzes to form the hydrated metal oxide and acetic acid.

The amount of acetic acid employed or present at any time should not exceed substantially one to five per cent, being preferably below the latter figure. Thus, I have discovered that aluminum when treated with approximately one per cent of acetic acid will yield a solution containing five per cent aluminum oxide. This solution when slowly dehydrated yields a glassy, transparent, amorphous gel, possessing adsorptive properties equal to and in some cases better than that of the best silica gel. Furthermore, the gel exerts a powerful catalytic effect. On the other hand, activated alumina obtained from the dehydration of gelatinous precipitates, exhibits adsorptive properties equal only to one-third or one-half that of silica gel. The transparency of the gel denotes the fineness of the dispersion, i. e., the presence of multitudinous exceedingly fine capillaries, and hence the adsorbent efficiency. As above stated, the pores or capillaries, are exceedingly fine, being less than a wave length of visible light.

By the term "transparency," as used in the specification and claims, I mean to connote the desired porosity, as above described, and do not intend to exclude a material of the desired porosity, but lacking transparency only because of the presence of such substances as pigments, oils, or other ingredients which do not destroy cell porosity and the consequent high adsorbent efficiency. Moreover, by the term "transparency," I mean transparency in relatively thin sections, for example, less than one-quarter inch in thickness, since material which is transparent in these relatively thin structures will, in greater thicknesses, be substantially opaque, while at the same time having the desired high adsorbent efficiency.

As recited above, the gel products of this invention are heat stable. That is to say, there is little or no tendency to crystallize upon being subjected to heat up to 500° C. for a period of from 5 to 6 hours. Commercial silica gel, for example, will exhibit a marked tendency to crystallize under these conditions. This heat stability permits considerable latitude in the time and temperature of activation.

Briefly, the reaction of the metal with the acid results in the formation of the unstable acetate which constantly undergoes hydrolysis in the aqueous medium to acetic acid and hydrated aluminum oxide. The acetic acid resulting from the hydrolysis remains in the aqueous medium as a potential reactant with the metal until the reaction has progressed to the extent desired.

Ordinarily, the rate of dissolution of aluminum is slow, but may be accelerated by amalgamation. For example, a small amount (.05–.5%) of mercurous oxide added to the acetic acid has been found satisfactory, and at the end of the reaction the metallic mercury may be separated from the solution and reused. The purpose of the accelerating agent is to prevent the formation of an oxide coating on the aluminum such as would prevent its reaction with the acetic acid and its subsequent hydrolysis. As is well known, mercury prevents the oxide film from adhering to the aluminum. That is to say, the oxide tends to form on the mercury compound rather than the aluminum. Other accelerating agents may be used.

In this connection, the attack of aluminum by dissolved electrolytes is considerably retarded, if not stopped, by the formation of a surface layer of insoluble alumina. It appears that by having the proper concentration of acetic acid the alumina is dispersed into a sol, thus preventing the stifling of the hydrolysis of the metal.

If the acid is allowed to act upon the amalgamated aluminum at room temperature, the attack upon the metal is eventually stopped by setting of the alumina sol to a firm hydrogel. However, at an elevated temperature of about 70° C., this setting does not occur, and therefore the attack on the metal may be continued until a more concentrated sol is produced. Materially higher temperatures are to be avoided, inasmuch as the dehydration of the aluminum hydroxide is so far advanced that the mixture does not yield a satisfactory gel.

As one example, I use 100 parts of water, 2 parts of aluminum, 1 part acetic acid and $\frac{1}{25}$ part of mercuric oxide. The solution is allowed to react at substantially 70° C. until the aluminum disappears. Thereafter, the solution is centrifuged to throw out the mercury which is separated, and the solution then slowly dried to form the resulting hard, glassy and transparent heat stable gel characterized by having exceedingly fine capillaries. It should be understood that the above example is purely representative, being illustrative of one instance in which the critical conditions herein recited are employed to produce the novel product.

By reason of the critical control of the concentration of acetic acid, it is possible throughout the reaction period to regulate the amount of aluminum acetate present at any time. Therefore, I control the reaction so that the presence of the soluble salt is at no time sufficient to produce any appreciable coagulation of the aluminum oxide sols, and there is maintained a very uniform and complete dispersion of the hydrosols. If the concentration of the acetic acid is too high, e. g., five percent or over, an unsatisfactory gel is formed. This behavior may be explained by the presence of aluminum acetate in the sol. That is to say, and as illustrating another process in accordance with this invention, the material obtained by using concentrated acetic acid solutions was allowed to come in contact with small amounts of ammonia vapor, the latter being allowed to slowly diffuse into the hydrosol or hydrogel. The aluminum acetate and acetic acid were converted into ammonium acetate, which substance was subsequently driven off by heat. In this manner, a satisfactory gel was produced, but inasmuch as the ammonia must be very slowly added, the procedure is not as efficient as that above described.

It will, therefore, be observed that by the control exercised at no time is the amount of electrolytes present, before or during dehydration, above the threshold value of the concentration which would coagulate the metal oxide. By eliminating the presence of an objectionable amount of electrolytes or other coagulating influences, the hydrosols are in an exceedingly fine state of dispersion, and this I have discovered contributes to the formation of a gel of the highest adsorbing efficiency, i. e., a transparent gel structure.

When the reaction has progressed to the required point, and the hydrosols are in an optimum condition of dispersion, the colloidal solution is converted to the gel phase. This may be accomplished in any number of ways; for example by vacuum treatment, heat treatment at atmospheric pressure, or equivalent dehydration procedures. Dehydration with the hydrosols in a fine state of dispersion and the solution substantially devoid of electrolytes, occasions no building up or increasing of the concentration of electrolytes, since the acid employed is volatile and is volatilized with the water and any acetate present breaks down into alumina sol and acetic acid.

As a modification of the material and the method, I may include oils, pigments, or other substances which impart color and opaqueness and which do not destroy the porosity and high adsorbent efficiency. As hereinbefore stated, such substances are comprehended within the term "transparent" as used in the specification and claims.

I claim:

1. The process of preparing aluminum oxide gels which comprises forming a solution of an aluminum salt by subjecting aluminum metal to the action of an aqueous solution of a weak organic acid capable of forming a readily hydrolyzed soluble salt of aluminum and simultaneously hydrolyzing the aluminum salt to form an aluminum oxide sol at a temperature which will preclude gelation of the aluminum sol, the acid concentration being controlled so that the solution is substantially free of electrolytes in amount sufficient to coagulate the aluminum oxide sol, and converting the sol to the gel phase by dehydration.

2. The process of claim 1 in which the aluminum metal is amalgamated so as to accelerate dissolution of the aluminum, and the amalgamating agent is separated from the solution before dehydration to form the gel.

3. The process of claim 1 in which the organic acid is acetic acid.

4. The process of claim 1 in which the aluminum metal is amalgamated with an amalgamating agent comprising mercury so as to accelerate dissolution of the aluminum, and the amalgamating agent is separated from the solution before dehydration to form the gel.

5. The process of claim 1 in which about 1% to 5% of acetic acid is employed.

6. The process of claim 1 in which the reaction is carried out at a temperature of about 70° C.

7. The process of claim 1 wherein during dehydration substantially all of the volatile acid is removed and substantially all of the salt present is decomposed to form oxide sols and volatile acid, which latter is likewise removed, whereby the concentration of electrolytes is not increased during drying.

8. The process of claim 1 in which small amounts of a weak volatile base are contacted with the materials for reaction with the acid and aluminum salt to form a volatile salt, and the volatile salt is removed during dehydration.

9. The process in accordance with claim 1 in which small amounts of ammonia are contacted with the materials for reaction with the acid and aluminum salt to form a volatile salt and the volatile salt is removed during dehydration.

WALTER A. PATRICK, Jr.